US006236839B1

(12) United States Patent
Gu et al.

(10) Patent No.: US 6,236,839 B1
(45) Date of Patent: May 22, 2001

(54) METHOD AND APPARATUS FOR CALIBRATING A SMART ANTENNA ARRAY

(75) Inventors: Yucong Gu; Shiping Li; Zhang Ping Yang, all of Alameda, CA (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/464,933

(22) Filed: Dec. 16, 1999

Related U.S. Application Data
(60) Provisional application No. 60/153,247, filed on Sep. 10, 1999.

(51) Int. Cl.[7] .................................................. H04Q 7/20
(52) U.S. Cl. ........................ 455/67.4; 455/423; 455/424; 455/561; 455/562; 455/278.1; 342/359; 342/360; 342/368
(58) Field of Search .................... 455/561, 562, 455/129, 277.1, 277.2, 67.1, 425; 342/359, 360, 361, 363, 364, 365, 366, 367, 368, 369, 380, 381, 382, 384

(56) References Cited

U.S. PATENT DOCUMENTS

| | | | |
|---|---|---|---|
| 5,400,037 | * 3/1995 | East | 342/372 |
| 5,559,519 | * 9/1996 | Fenner | 342/174 |
| 5,771,439 | * 6/1998 | Kennedy Jr, et al. | 455/63 |
| 5,936,569 | * 8/1999 | St.ang.hle et al. | 342/174 |
| 6,006,110 | * 12/1999 | Raleigh | 455/561 |
| 6,009,124 | * 12/1999 | Smith et al. | 375/267 |
| 6,084,545 | * 7/2000 | Lier et al. | 342/360 |
| 6,101,399 | * 8/2000 | Raleigh et al. | 455/561 |
| 6,104,935 | * 8/2000 | Smith et al. | 455/562 |
| 6,122,260 | * 9/2000 | Liu et al. | 370/280 |
| 6,124,824 | * 9/2000 | Xu et al. | 342/174 |
| 6,133,868 | * 8/2000 | Butler et al. | 342/174 |
| 6,141,567 | * 10/2000 | Youssefmir et al. | 455/562 |

* cited by examiner

Primary Examiner—Daniel Hunter
Assistant Examiner—Yemane Woldetatios
(74) Attorney, Agent, or Firm—Claude A. S. Hamrick; Justin Boyce; Oppenheimer Wolff & Donnelly LLP

(57) ABSTRACT

A smart antenna system includes: an antenna array including a plurality of antenna elements, and at least one calibration element; a plurality of transceiver units each having a port coupled with an associated one of the antenna elements, a receive port, and a transmit port; a transceiver calibration unit including a port coupled with the calibration element via a coaxial cable, a receive port, and a transmit port; and signal processing means communicatively coupled with each of the receive ports and the transmit ports of each of the transceiver units, and coupled with the calibration receive port and the calibration transmit port of the calibration unit. A transmitter calibration path associated with each antenna element extends from the transmit port of the associated transceiver unit to the associated antenna element, from the associated antenna element to the calibration element, and from the calibration element to the receive port of the calibration unit. A receiver calibration path associated with each antenna element extends from the transmit port of the calibration unit to the calibration element, from the calibration element to the associated antenna element, and from the associated antenna element to the receive port of the associated transceiver unit. The signal processing means is responsive to transmit mode resultant signals developed as a result of reference signals propagating through associated transmitter calibration paths. The signal processing means is also responsive to receive mode resultant signals developed as a result of reference signals propagating through associated receiver calibration paths.

19 Claims, 6 Drawing Sheets

METHOD AND APPARATUS FOR CALIBRATING A SMART ANTENNA ARRAY

This application claims benefit of provisional application No. 60/153,247, filed Sep. 10, 1999.

BACKGROUND OF THE INVENTION

1. Field of the Invention

The present invention relates generally to techniques for calibrating an adaptive antenna array system, and more particularly to a method and apparatus for calibrating a multi-carrier smart antenna array system.

2. Description of the Prior Art

Antenna arrays are commonly used in a wide variety of systems that transmit and/or receive radio frequency (RF) signals. Examples of such systems include wireless communication systems, such as cellular telephone systems, and radar systems. An antenna array, which includes a plurality of antenna elements, provides improved performance characteristics over a single element antenna. The improved characteristics include improved signal to noise ratio, improved interference rejection for received signals, reduced power requirements for transmitted signals, as well as improved directionality.

For an ideal antenna array, the signal characteristics, including attenuation and phase shift, associated with each element of the array are identical. An important goal in designing and manufacturing an antenna array is to optimize the signal characteristics of the array to be as close to ideal as possible. As a result, it is very difficult and expensive to manufacture an antenna array system. Antenna array calibration provides a means for optimizing the signal characteristics of an antenna array using a calibration vector, which is determined based on actual signal characteristics of the array, in order to compensate for performance variances of the actual signal characteristics of each element of the array.

FIG. 1 shows a schematic block diagram of a prior art beam steering antenna array calibration system at 10. The system 10 includes a beam steering antenna array transceiver system 12, including: an antenna array 14 having a plurality of N antenna elements 16; a plurality of N transceivers 18 designated TRANSCEIVER_1 TRANSCEIVER_2, . . . , TRANSCEIVER_N, each of the transceivers 18 having a port 20 communicatively coupled with corresponding one of the antenna elements 16 via a corresponding coaxial cable 22; and a calibration processing unit 24 communicatively coupled with each of the transceivers 18 as further explained below.

Each of the transceivers 18 further includes: a duplexer 30 having a port 32 communicatively coupled with the corresponding one of the antenna elements 16 via port 20 of the transceiver and via the corresponding coaxial cable 22, a receive port 34, and a transmit port 36; a receive processor 38 having an input port 40 communicatively coupled with port 34 of the duplexer, and an output 42; and a transmit processor 44 having a port 46 communicatively coupled with port 36 of the duplexer, and an input port 48. The calibration processing unit 24 includes a plurality of transceiver ports designated TRANSCEIVER_PORT_1, . . . TRANSCEIVER_PORT_N, each of the transceiver ports having an input port 52 for receiving a signal from port 42 of the receive processor 38 of the corresponding one of the transceivers 18, and an output port 54 for providing a signal to port 48 of the transmit processor 44 of the corresponding one of the transceivers.

In operation, the beam steering antenna array transceiver system 12 may be used in any of a variety of applications including a base station for a cellular telephone system. The antenna array 14 receives signals from mobile units, and the controlling processor 24 is operative to analyze the received signals and determine a position vector associated with the corresponding received signal in order to determine the position of the mobile unit. The position vector is then used to control a radiation pattern generated by the antenna array 14 wherein the beam is controlled by varying the phases of signals generated at the output ports 54 of the controlling processor 24 in order to focus the beam in the direction of the corresponding mobile unit.

Each of the antenna elements 16 is associated with a corresponding receive signal path and a corresponding transmit signal path. The receive path associated with each one of the antenna elements 16 extends from the corresponding antenna element 16 to the corresponding input port 52 of the calibration processing unit 24 traversing the corresponding antenna element 16, the corresponding cable 22, the duplexer 30, and the receive processor 38 of the corresponding one of the transceivers 18. The transmit signal path associated with each one of the antenna elements 16 extends from the associated one of the output ports 54 of the calibration processing unit 24 to the corresponding antenna element 16 traversing the corresponding transmit processor 44, duplexer 30, and coaxial cable 22. In an ideal antenna array transceiver system, the signal path characteristics associated with each one of the antenna elements 16 are identical to each other, and the signal characteristics associated with each one of the receiver signal paths are also identical to each other. The signal path characteristics include attenuation, or amplitude difference, in a signal as a result of propagating through a corresponding path, and the phase shift in a signal as a result of propagating through a corresponding path. Therefore, each one of the antenna elements 16 has associated sets of transmit and receive signal characteristics including the phase shift and attenuation associated with the corresponding transmit and receive signal paths. Note that each of the antenna elements themselves may have different signal characteristics associated therewith as a result of very small variances in the dimensions of the antenna elements as well as in the material properties of the corresponding antenna elements.

In practice, an antenna array transceiver system provides less than ideal performance because the signal characteristics of the transmit paths and receive paths associated with each of the antenna elements vary. Therefore, it is necessary to determine the signal characteristics of each of the receive signal paths and each of the transmit signal paths so that calibration compensation values may be determined for each. The calibration compensation values are used to determine a calibration vector which is used to compensate for variances in the signal characteristics associated with each of the transmit signal paths and receive signal paths of the transceiver system. Antenna array calibration provides a means for implementing an antenna array as closely system which provides acceptable performance.

In accordance with conventional processes for calibrating a beam steering directional antenna array transceiver system, either a far-field calibration processor 64 or a transponder 60 may be used to determine a calibration vector for each of a plurality of beam directions determined by positional relationships between the transponder and the array 14. The transponder 60 is responsive to signals transmitted thereto from corresponding ones of the antenna elements 16, and is operative to transmit a return signal back to the antenna array 14. The return signal is received by corresponding ones of the antenna elements 16, and provided to the input ports 52 of the calibration processing unit 24 via the corresponding ones of the coaxial cables 22 and transceivers 18. While either of the external calibration processor 64 or transponder 60 may be used to calibrate the system 12, use of the external calibration processor 64 is complicated because the processor 64 must be controlled either via remote control or manually by a technician in the field.

The object of the calibration process is to determine a compensation vector for use in operation of the system 12 in order to adjust the transmit signals, and receive signals generated and received at ports 52 and 54 of the calibration processing unit 24 in order to compensate for differences between the signal characteristics of each of the transmit and receive signal paths of each of the transceivers 18 and associated elements 16. The calibration process generally includes transmitting and receiving signals between each one of the antenna elements 16 of the array 14 and the transponder 60. The transponder 60 is positioned at a distance far enough away from the antenna array 14 so that the distances between each of the antenna elements 16 is negligible in comparing the signals transmitted and received between the transponder 60 or processor 64 and each corresponding one of the antenna elements 16.

The calibration process includes a receive path calibration process and a transmit path calibration process. In the transmit path calibration process, the calibration processing unit 24 is operative to provide a first reference signal at port 54 of TRANSCEIVER_PORTS_1 to the TRANSCEIVER_1 causing a signal to be radiated from the associated one of the antenna elements 16 to the transponder 60. Next, the calibration processing unit 24 provides a second reference signal at port 54 of TRANSCEIVER_PORTS_2 to the TRANSCEIVER_2 causing a signal to be radiated from the associated one of the antenna elements 16 to the transponder 60. The transponder 60, which receives the signals, may include logic for determining the signal characteristics associated with each signal. Alternatively, the transponder 60 may be coupled via a cable (not shown) to the calibration processing unit 24 which receives data and determines the signal characteristics associated with each of the signals. Based on the signal characteristics associated with each of the signals, a transmit mode calibration vector is determined for each one of the antenna elements.

In the receive path calibration process, the calibration processing unit 24 is responsive to resultant signals received at each of its ports 52, each of the resultant signals being developed at the ports 52 of the processor 24 in response to reference signals generated by the transponder 60 and received by corresponding ones of the elements 16, and propagating through the corresponding one of the cables 22 and transceivers 18. A receive calibration vector is determined by determining amplitude differences and phase shifts between the resultant signals and associated reference signals.

Note that it is necessary in the beam steering process to move the location of the transponder 60, or external calibration processor 64, in order to determine signal characteristics associated with each of the transceivers and corresponding elements for a plurality of beam directions associated with the antenna array 14. The beam must be focused to the position of the transponder.

Another type of antenna array transceiver array system is a smart antenna array transceiver system. Such systems include multi-carrier smart antenna array systems. Unlike traditional beam steering directional antenna array systems which must be calibrated using a far field calibration processor or transponder to determine a calibration director vector for each of the plurality of directions, a smart antenna array system may be calibrated in a different manner. A smart antenna array system is operative to adaptively change the beam direction according to the mobile target direction. A calibration vector provides compensation for variances of the transmit and receive signal paths.

FIG. 2A shows a schematic circuit block diagram of an internal loop calibration system at 80 for calibrating a smart antenna array transceiver system 82. The system 82 includes: an antenna array 14 having a plurality of antenna array elements 16; a plurality of N internal loop calibration transceivers 84 designated TRANSCEIVER_1, TRANSCEIVER_1, . . . TRANSCEIVER_N, each of the transceivers 84 including a port 86 communicatively coupled with a corresponding one of the elements 16 via a corresponding one of a plurality of coaxial cables 88, a reference signal port 90 communicatively coupled with a reference signal terminal 92, a receive signal port 94, and a transmit signal port 96; and a calibration processing unit 100 having a plurality of N sets of transceiver ports each having a corresponding input port 102 communicatively coupled with port 94 of a corresponding one of the transceivers 84, and an output port 104 communicatively coupled with port 96 of the corresponding one of the transceivers 84. A reference signal generator 110, having an output 112, is used to provide a reference signal to each of the terminals 92 in accordance with a prior art "in-loop" calibration process further described below.

FIG. 2B shows a schematic circuit block diagram illustrating further details of one of the internal loop calibration transceivers 84 of FIG. 2A. Each of the transceivers 84 further includes: a first RF signal coupler 122 having a first port 124 communicatively coupled with the corresponding one of the antenna elements 16 via port 86 and via the corresponding coaxial cable 88, a coupling port 126 for receiving the reference signal, or calibration signal, from the reference signal generator 110 (FIG. 2A) via the terminal 92, and a second port 128, a second RF signal coupler 130 having a first port 132 communicatively coupled with port 128 of the first RF signal coupler 122, a coupling port 134, and a second port 136; a duplexer 138 having a port 140 communicatively coupled with port 136 of the second RF signal coupler 130, a transmit port 142, and a receive port 144; a transit processor 146 having an input port 148 communicatively coupled with the corresponding one of the ports 104 of the calibration processing unit 100 via port 96 of the transceiver, and an output port 150 communicatively coupled with the transmit port 142 of the duplexer; an attenuator 152 having an input port 154 communicatively coupled with port 134 of the second RF signal coupler 130, and an output port 156; a switch 160 having a port 162 communicatively coupled with the receive port 144 of the duplexer 138, a port 164 communicatively coupled with port 156 of the attenuator 152, and a port 166; and a receive processor 170 having an input port 172 communicatively coupled with port 166 of the switch 160, and an output port 174 communicatively coupled with the corresponding one of the receive signal ports 102 of the calibration processing unit 100 via port 94 of the transceiver 84.

The switch 160 may be set to connect its port 164 to its port 166, or may be set to connect its port 162 to its port 166 for the purpose of determining transmit calibration vectors and receive calibration vectors as further explained below. The attenuator 152 is also used in the calibration process along with the first and second RF signal couplers 122 and 130 and the reference signal generator 110 (FIG. 2A) which provides the reference signal to terminal 92. Typically, a technician in the field must connect the reference signal generator 110 (FIG. 2A) to each of the reference signal terminals 92 of the transceivers 84 in succession during the prior art calibration process which is a laborious task.

In a receiver calibration mode, switch 160 is set to couple the receive port 144 of the duplexer 138 to the input port 172 of the receive processor 170 by connecting ports 162 and 166 of the switch Also in the receive calibration mode, the corresponding one of the coaxial cables 88 is disconnected from the corresponding antenna element 16, and the cable is terminated in order to isolate the corresponding antenna element from the transceiver. Further, in the receive calibration mode, the signal generator 110 (FIG. 2A) is connected to the corresponding terminal 92 and activated to provide a reference signal to the coupling port 126 of the first RF signal coupler 122. The object of the prior art receive calibration process is to determine signal characteristics associated with a tested receive signal path 180 extending from the coupling port 126 of the first RF signal coupler 122 to the input port 102 of the processing unit 100 via ports 126 and 128 of the first RF signal coupler 122, ports 132 and 136 of the second RF signal coupler 130, ports 140 and 144 of the duplexer 138, ports 162 and 166 of the switch 160, and the receive processor 170.

By applying the reference signal to the terminal 92 while the switch 160 is set in the receive mode and while the cable 88 is terminated as described above, a receive calibration mode resultant signal is developed at port 174 of the receive processor 170 as a result of the reference signal propagating through the tested receive signal path 180. The calibration processing unit 100 is responsive to the receive mode calibration resultant signal received at its port 102 from port 174 of the receive processor 170, and operative to determine signal characteristics associated with the tested receive signal path 180 based on an amplitude difference and phase shift between the reference signal applied to terminal 92 and the receive mode calibration resultant signal. In accordance with this prior art method, it is assumed that the signal characteristics of the tested receive signal path 180 adequately represent the signal characteristics of an actual receive path which extends from the associated antenna element 16 to the signal path characteristics of the associated input port 102 of the processing unit 100 via the associated one of the cables 88, ports 124 and 128 of the first RF signal coupler 122, ports 132 and 136 of the second RF signal coupler 130, ports 140 and 144 of the duplexer 138, ports 162 and 166 of the switch 160, and the receive processor 170. An important problem associated with the prior art internal loop calibration process is that the signal characteristics associated with the tested receive signal path 180 do not include the signal characteristics associated with the antenna element 16, and the associated one of the coaxial cables 88 because these elements are bypassed by the injection of the reference signal at terminal 92 which is injected at the coupling port 126 of the first RF signal coupler 122. Therefore, the described prior art calibration process does not account for differences in the signal characteristics associated with each of the antenna elements 16, each of the coaxial cables 88, and the path between ports 124 and 128 of each of the couplers 122.

Another problem associated with the prior art internal loop calibration process is that the switch 160, attenuator 152, and RF signal couplers 122 and 130 introduce a significant amount of attenuation in the receive signal path of the transceiver 84 which reduces the sensitivity of the antenna system. Yet another problem associated with the prior art internal loop system is that it is assumed that the attenuator 152 has a precisely known attenuation value, while in practice the attenuation value of the attenuator 152 may vary.

In a transmit calibration mode, the switch 160 is set to couple port 156 of the attenuator 152 to port 172 of the receive processor 170 by connecting ports 164 and 166 of the switch The prior art transmit mode calibration process requires measuring signal characteristics of two signals paths in accordance with a two step process as further explained below.

In accordance with a first step of the prior art internal loop transmit mode calibration process, the calibration processing unit 100 generates reference signals at each of its ports 104, each of the reference signals having a known phase and amplitude. The reference signal generated at each of the ports 104 propagates through a loop signal path 182 traversing the transmit processor 146, ports 142 and 140 of the duplexer 138, ports 136 and 134 of the second RF signal coupler 130, the attenuator 152, ports 164 and 166 of the switch 160, and the receive processor 170. The calibration processing unit 100 is responsive to a first transmit mode resultant signal received at its port 102, the first transfer mode resultant signal being developed at the output port 174 of the receive processor as a result of the reference signal, generated at the corresponding port 104, propagating through the loop signal path 182. The calibration processing unit 100 is operative to compare the resultant signal received at port 102 to the associated reference signal generated at the corresponding one of the ports 104 which has a known phase and amplitude. The calibration processing unit 100 is further operative to determine the signal characteristics associated with the signal path 182. The signal characteristics associated with the signal path 182 of each of the transceivers 84 (FIG. 2A) are used to determine a vector X which is used to determine a transmit mode calibration vector as further explained below.

In accordance with a second step of the prior art internal loop transmit mode calibration process, the signal characteristics associated with a residual signal path 184 must be measured. The residual signal path 184 extends from port 126 of the first RF signal coupler 122 to port 102 of the calibration processing unit 100 and transfers ports 126 and 128 of the first RF signal coupler, ports 132 and 134 of the second RF signal coupler 130, the attenuator 152, ports 164 and 166 of the switch 160, and the receive processor 170. The switch 160 is set to communicatively couple port 156 of the attenuator 152 with port 172 of the receive processor 170 by connecting ports 164 and 166 of the switch. A second reference signal, having a known phase and amplitude, is then applied to the reference signal terminal 92 using the reference signal generator 110 (FIG. 2A). The calibration processing unit 100 is responsive to a second resultant signal received at its port 102, and operative to determine the signal characteristics associated with the signal path 184 by determining a phase shift and amplitude difference between the reference signal provided to the reference signal terminal 92 and the second resultant signal which is developed as a result of the reference signal propagating through the signal path 184. The signal characteristics associated with each path 184 of the transceivers 84 (FIG. 2A) are used to determine a vector Y.

A transmit calibration vector associated with a tested transmit signal path may be determined in accordance with relationship (1), below.

$$\text{Transmit calibration vector} = X \bullet /Y \qquad (1)$$

Wherein the vector Y represents the signal characteristics associated with each of the residual paths 184 of the transceivers 84 (FIG. 2A), and wherein the vector X represents the signal characteristics associated with each of the loop signal paths 182 of the transceivers 84 (FIG. 2A). Relationship (1), above, yields a transmit calibration vector that is determined by considering the signal characteristics associated with a tested transmit signal path which extends from port 126 of the first RF signal coupler 122 to port 174 of the receive processor 170 via ports 126 and 128 of the first RF signal coupler, ports 132 and 136 of the second RF signal coupler 130, ports 140 and 144 of the duplexer 138, ports 162 and 166 of the switch 160, and the receive processor 170.

Another important problem associated with the prior art internal loop calibration process is that the signal characteristics associated with the tested transmit signal path do not include the signal characteristics associated with the antenna element 16, and the associated one of the coaxial cables 88 because these elements are bypassed by the injection of the reference signal at terminal 92 which is injected at the coupling port 126 of the first RF signal coupler 122. The signal characteristics associated with each of the elements 16 are significant because the radiation from each of the elements 16 is different as each of the elements 16 has different signal characteristics including slightly different dimensions and slightly different material properties.

SUMMARY OF THE INVENTION

It is an object of the present invention to provide an apparatus and method for calibrating a smart antenna array system where it is unnecessary to introduce calibration components, such as switches, couplers, and attenuators, into the transmit and receive signal paths which provide coupling between the antenna elements of the array and signal processing units of the system.

Another object of the present invention is to provide an apparatus and method for calibrating a smart antenna system wherein the sensitivity of the system is not reduced by the introduction of calibration components.

Another object of the present invention is to provide an apparatus and method for calibrating a smart antenna system wherein the signal characteristics associated with each of the antenna elements, and the signal characteristics associated with the cables connected to the antenna elements, are taken into account in the calibration process.

A further object of the present invention is to provide improved accuracy in calibrating a smart antenna system, so that the efficiency of the smart antenna beam forming will be improved.

Yet another object of the invention is to provide an apparatus enabling a simplified process for calibrating a smart antenna system.

Briefly, a presently preferred embodiment of the present invention includes a smart antenna system including an antenna array including a plurality of antenna elements, and at least one antenna calibration element for radiating and receiving radiated signals to and from each of the antenna elements. The antenna elements are disposed in a generally circular array, and the calibration element is disposed proximate a center point of the array.

The smart antenna system further includes: a plurality of transceiver units each having an input/output port communicatively coupled with an associated one of the antenna elements via am associated antenna coupling means, a receive port, and a transmit port; a transceiver calibration unit including a calibration input/output port communicatively coupled with the calibration element via a coaxial cable, a calibration receive port, and a calibration transmit port; and signal processing means communicatively coupled with each of the receive ports and the transmit ports of each of the transceiver units, and communicatively coupled with the calibration receive port and the calibration transmit port of the calibration unit.

A transmitter calibration path associated with each one of the antenna elements extends from the transmit port of the associated transceiver unit to the associated antenna element, from the associated antenna element to the calibration element, and from the calibration element to the calibration receive port of the calibration unit. A receiver calibration path associated with each one of the antenna elements extends from the calibration transmit port of the calibration unit to the calibration element, from the calibration element to the associated antenna element, and from the associated antenna element to the receive port of the associated transceiver unit.

The signal processing means is operative in a transmit calibration mode to provide a transmit mode reference signal to the transmit port of each of the transceiver units, and is responsive to transmit mode resultant signals developed as a result of associated ones of the transmit reference signals propagating through associated ones of the transmitter calibration paths. The signal processing means is also operative to determine a transmit mode calibration vector by determining amplitude differences and phase shifts between the transmit mode reference signals and the associated transmit mode resultant signals.

The signal processing means is operative in a receive calibration mode to provide receive mode reference signals to the calibration transmit port of the calibration unit, and is responsive to receive mode resultant signals developed as a result of associated ones of the receive mode reference signals propagating through associated ones of the receiver calibration paths. The signal processing means is further operative to determine a receive mode calibration vector by determining amplitude differences and phase shifts between the receive mode reference signals and the associated receive mode resultant signals.

An important advantage of the smart antenna system of the present invention is that it provides improved calibration accuracy thereby improving the beam forming efficiency of the system.

Another advantage of the smart antenna system of the present invention is that the signal characteristics associated with each of the antenna elements, and with the coaxial cables connecting the antenna elements to the transceivers, are calibrated.

A further advantage of the present invention is that the sensitivity of the smart antenna system is not reduced by the introduction of in-loop calibration components which cause attenuation of signals.

The foregoing and other objects, features, and advantages of the present invention will be apparent from the following detailed description of the preferred embodiment which makes reference to the several figures of the drawing.

IN THE DRAWING

Figure 3:
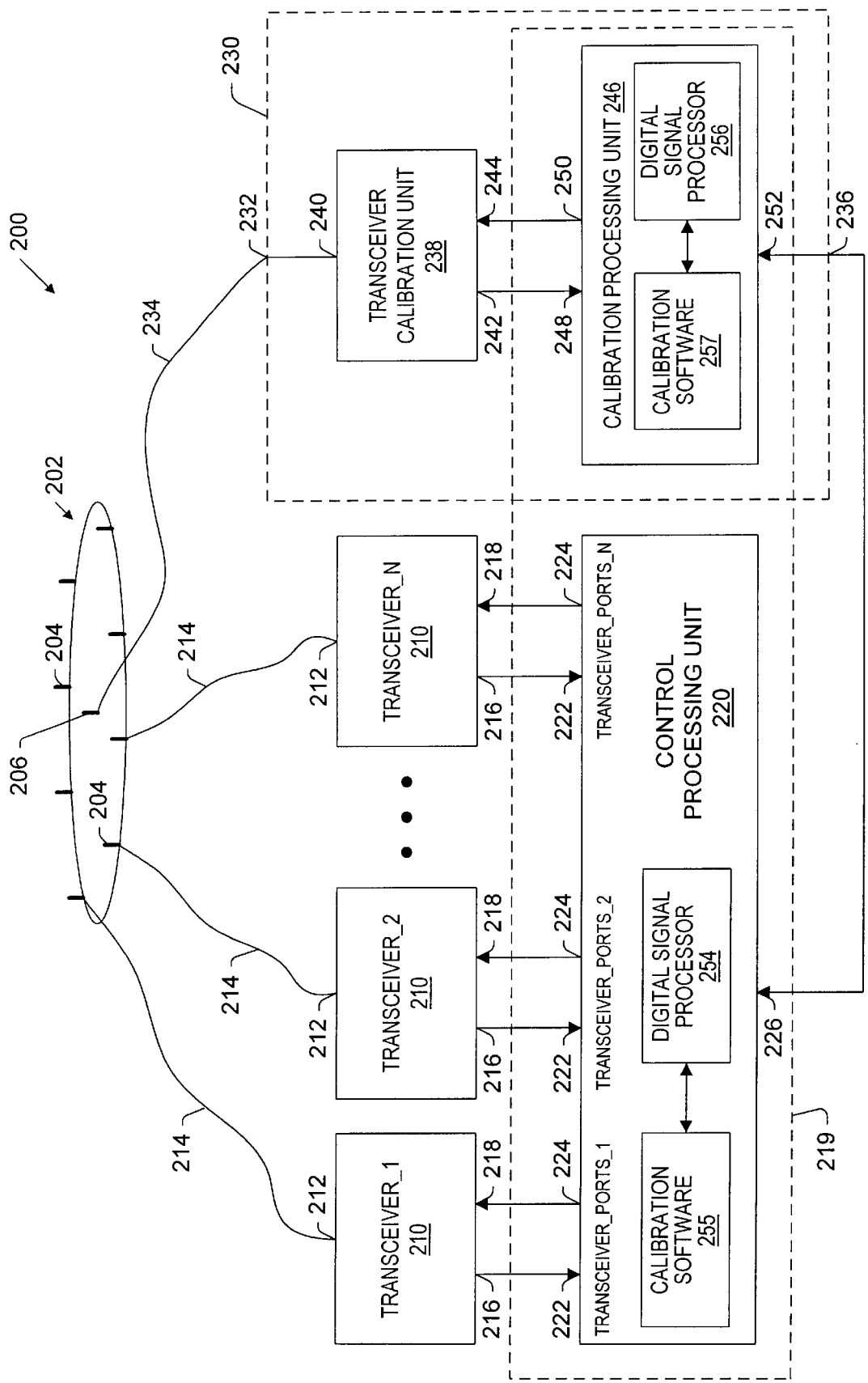
Figure 4:
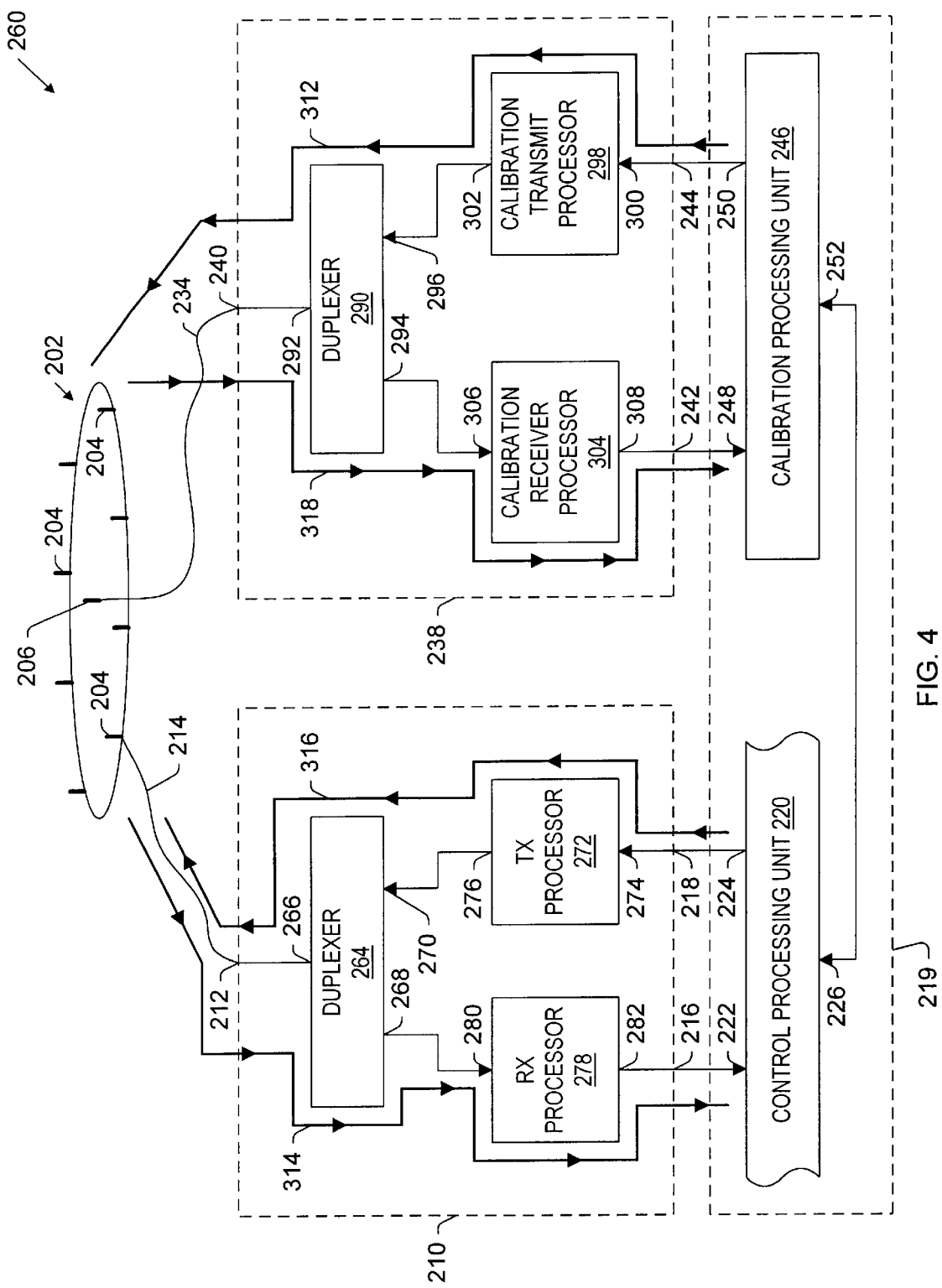
Figure 5:
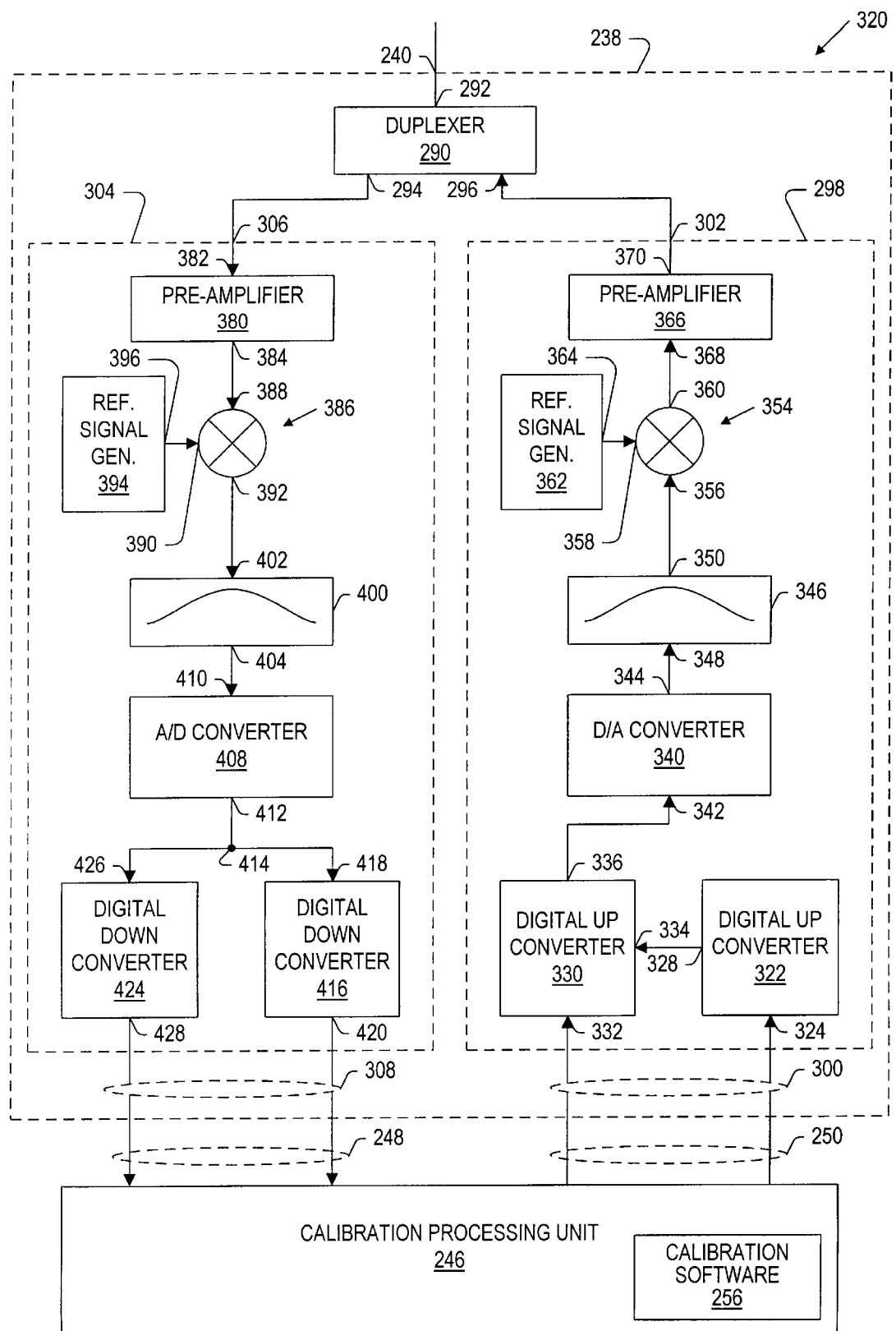

FIG. 3 is a generalized schematic circuit block diagram of a smart antenna transceiver system in accordance with the present invention, the system including: an antenna array having Et plurality of antenna elements and an antenna calibration element; a plurality of transceivers each being communicatively coupled with one of the antenna elements; and a calibration transceiver unit which is external to the transceivers;

FIG. 4 is a schematic circuit block diagram illustrating further details of one of the transceivers, and the calibration unit of the system of FIG. 3; and FIG. 5 is a schematic circuit block diagram of the calibration transceiver of FIG. 3.

DETAILED DESCRIPTION OF THE PREFERRED EMBODIMENTS

FIG. 3 shows a schematic circuit block diagram of a smart antenna array transceiver system at 200 in accordance with the present invention, the system 200 having in-system external loop calibration features. The system 200 includes: an antenna array 202 having a plurality of N antenna elements 204 disposed in a generally circular array, and an antenna calibration element 206 disposed proximate a center point of the array of elements; a plurality of N transceiver units 210 designated TRANSCEIVER_1, TRANSCEIVER_2, . . . TRANSCEIVER_N, each of the transceiver units 210 having an input/output port 212 connected with an associated one of the antenna elements 204 via an associated one of a plurality of coaxial cables 214, a receive port 216, and a transmit port 218; a control processing unit 220 having a plurality of sets of transceiver ports each being communicatively coupled with an associated one of the transceiver units 210, each of the transceiver ports having an input port 222 communicatively coupled with the receive port 216 of the associated transceiver, and a port 224 communicatively coupled with the transmit port 218 of the associated transceiver, the processing unit 220 also having a calibration control signal port 226 further explained below; and an in-system multi-carrier external loop calibration unit 230 having an input/output port 232 communicatively coupled with the antenna calibration element 206 via a coaxial cable 234, and a calibration control signal port 236 communicatively coupled with port 226 of the control processing unit 220. In an alternative embodiment of the present invention, the antenna elements 204 and the calibration element 206 may be coupled to the associated transceiver units 210 and to the calibration unit 230 respectively via wave-guide or any other high frequency transmission medium.

The calibration unit 230 includes: a transceiver calibration unit 238 having an input/output port 240 communicatively coupled with the antenna calibration element 206 via port 232 and via the cable 234, a receive port 242, and a transmit port 244; and an in-system calibration processing unit 246 having an input port 248 communicatively coupled with the receive port 242 of the transceiver calibration unit, an output port 250 communicatively coupled with the transmit port 244 of the transceiver calibration unit, and a calibration control signal port 252 communicatively coupled with port 226 of the control processing unit 220 via port 236 of the calibration unit.

The control processing unit 220 and calibration processing unit 246 provide an in-system calibration processing sub-system 219. In one embodiment of the present invention, the control processing unit 220 includes a digital signal processor 254 and a memory storage unit 255 for storing computer executable instructions for execution by the digital signal processor 254 for implementing an in-system multi-carrier external loop calibration process in accordance with the present invention. The calibration processing unit 246 also includes a digital signal processor 256 and a memory storage unit 257 for storing computer executable instructions for execution by the digital signal processor 256 for implementing further steps of the in-system multi-carrier external loop calibration process as further explained below. In an alternative embodiment of the present invention, the calibration processing sub-system 219 is formed as an integral unit having a single memory unit and a single digital signal processor for storing and executing all required instructions of the external loop calibration process of the present invention. Also in an embodiment of the present invention, the transceiver calibration unit 238 and calibration processing unit 246 are enclosed in a shielded enclosure for the purpose of isolating the calibration components from potential radiation interference from the transceivers 210.

In accordance with the in-system multi-carrier external loop calibration process of the present invention, the control processing unit 220 and calibration processing unit 246 are operative to generate reference signals, and receive resultant signals via the transceiver units 210 and calibration transceiver unit 238 and via corresponding ones of the antenna elements 204 and the calibration element 206 as further explained below.

A transmit mode calibration path associated with each one of the antenna elements 204 extends from the transmit port 218 of the associated one of the transceiver units 210 to the receive port 242 of the transceiver calibration unit 238. The transmit mode calibration path includes: a transmit path segment of the associated one of the transceiver units 210 which couples the input/output port 212 of the associated transceiver to the transmit port 218 of the associated transceiver; the associated cable 214; the associated antenna element 204; the calibration element 206; the cable 234; and a receive path segment of the calibration transceiver unit 238 which couples the input/output port 240 of the calibration transceiver to the receive port 242 of the calibration transceiver. Stated alternatively, the transmit mode calibration path associated with each of the antenna elements extends from the transmit port 218 of the associated transceiver unit to the associated antenna element 204, from the associated antenna element 204 to the calibration element 206, and from the calibration element 206 to the receive port 242 or the calibration unit 238.

A receive mode calibration path associated with each one of the antenna elements 204 extends from the transmit port 244 of the transceiver calibration unit 238 to the receive port 216 of the associated one of the transceiver units 210. The receive mode calibration path traverses: a transmit path segment of the calibration transceiver unit 238 which couples the input/output port 240 of the calibration transceiver to the transmit port 244 of the calibration transceiver; the cable 234; the calibration element 206; the associated antenna element 204; the associated one of the cables 214; and a receive path segment of the associated one of the transceiver units 210 which couples the input/output port 212 of the associated transceiver to the receive port 216 of the associated transceiver. Stated alternatively, the receive mode calibration path associated with each one of the antenna elements 204 extends from the transmit port 244 of the calibration unit 238 to the calibration element 206, from the calibration element 206 to the associated antenna element 204, and from the associated antenna element 204 to the receive port 216 of the associated transceiver unit In a receive calibration mode, the calibration processing unit 246 generates a receive mode reference signal at its port 250. The transceiver calibration unit 238 is responsive to the receive mode calibration reference signal received at its port 244 and operative to generate a signal at its port 240, the signal then being propagated via the coaxial cable 234 and radiated from the calibration antenna element 206. Each of the antenna elements 204 is responsive to the radiated signal radiated from the calibration antenna element 206. The control processing unit 220 is responsive to calibration control signals received at its input 226 from port 252 of the calibration processing unit 246, the calibration control signals indicating the magnitude and phase of the receive mode reference signals generated at port 250 of the calibration processing unit 246. The control processing unit 220 is also responsive to receive mode calibration resultant signals received at corresponding ones of the input ports 222 associated with corresponding ones of the antenna elements 204. The receive mode calibration resultant signals are developed at ports 216 of associated ones of the transceiver units 210 as a result of the receive mode reference signals propagating through the associated receive mode calibration paths. The control processing unit 220 is operative to analyze the phase and amplitude of the receive mode resultant signals, and operative to compare the receive mode resultant signals to the associated receive mode reference signals generated at output port 250 of the calibration processing unit 246. The control processing unit 220 is operative to determine phase shifts and amplitude differences between the receive mode reference signals and the associated receive mode resultant signals to yield a receive mode calibration vector as further explained below.

In a transmit calibration mode, the control processing unit 220 is operative to generate a transmit mode reference signal at each of its output ports 224. Each of the transceiver units 210 is responsive to the receive mode reference signal provided to its transmit port 218, and operative to generate a signal at its port 212 in order to cause a radiated transmit mode calibration reference signal to be radiated from the associated one of the antenna elements 204. The calibration element 206 is responsive to the radiated transmit mode calibration reference signals, and the transceiver calibration unit 238 is responsive to signals developed by the calibration antenna element 206 in response to the radiated transmit mode reference signals. The calibration transceiver unit 238 is operative to provide a transmit mode calibration resultant signal at its receive port 242. The trait mode resultant signals are developed at the receive port 242 of the transmit calibration unit 238 as a result of the associated transmit mode reference signals propagating through the associated transmit mode calibration paths. The calibration processing unit 246 is responsive to the transmit mode resultant signals associated with each one of the antenna elements 204, and operative to analyze the transmit mode resultant signals. The in-system calibration processing unit 246 is operative to compare the transmit mode resultant signals to the transmit mode reference signals, and is operative to determine a phase shift and amplitude difference between corresponding ones of the transmit mode reference signals and the transmit mode resultant signals to yield a transmit mode calibration vector $V_{tc}$ as further explained below.

FIG. 4 shows a schematic circuit diagram illustrating further details of one of the transceiver units 210, and the transceiver calibration unit 238 of the system 200 (FIG. 3) of the present invention. Each of the transceiver units 210 includes: a duplexer 264 having a port 266 communicatively coupled with the associated one of the antenna elements 204 via port 212 of the transceiver unit and via the associated one of the coaxial cables 214, an output port 268, and an input port 270; a transmit processor 272 having an input port 274 communicatively coupled with port 224 of the calibration processing unit 220 via the transmit port 218 of the transceiver unit, and an output port 276 communicatively coupled with port 270 of the duplexer; and a receive processor 278 having an input port 280 communicatively coupled with the output port 268 of the duplexer, and an output port 282 communicatively coupled with port 222 of the calibration processing unit 220 via port 216 of the transceiver unit.

The transceiver calibration unit 238 is very similar to the transceiver units 210 and includes: a duplexer 290 having a port 292 communicatively coupled with the calibration antenna element 206 via port 240 of the transceiver calibration unit and via the coaxial cable 234, an output port 294, and an input port 296; a calibration transmit processor 298 having an input port 300 communicatively coupled with port 250 of the calibration processing unit 246 via port 244, and an output port 302 communicatively coupled with port 296 of the duplexer; and a calibration receive processor 304 having an input port 306 communicatively coupled with port 294 of the duplexer, and an output port 308 communicatively coupled with port 248 of the calibration processing unit 246 via port 242 of the calibration transceiver unit.

The receive mode calibration reference signals, generated at port 250 of the calibration processing unit, propagate from port 250 of the calibration processing unit to the output of the calibration element 206 via a calibration unit transmit signal path 312 which extends from port 250 of the calibration processing unit to the output of the calibration antenna element 206 via the calibration transmit processor 298, ports 296 and 292 of the duplexer 290, the coaxial cable 234, and the calibration antenna element 206. In the receive calibration mode, a receive mode resultant signal, received at port 222 of the control processing unit 220 is developed as a result of the associated receive mode reference signal propagating through the receive mode calibration path. As the receive mode reference signal propagates through the receive mode calibration path the reference signal traverses the calibration unit transmit signal path 312, is radiated from the calibration element 206 to the associated antenna element 204, and ultimately propagates through a transceiver receive path 314 which extends from the input of the corresponding antenna element 204 to port 222 of the control processing unit 220 via the associated antenna element 204, the associated coaxial cable 214, ports 266 and 268 of the duplexer 264, and the receive processor 278.

In the transmit calibration, a transmit mode reference signal generated at port 224 of the control processing unit 220, propagates via a transceiver transmit path 316 which extends from port 224 of the control processing unit 220 to the output of the associated antenna element 204 via ports 274 and 276 of the transmit processor 272, ports 270 and 266 of the duplexer 264, the associated coaxial cable 214, and the associated antenna element 204. A transmit mode resultant signal, received at port 248 of the calibration processing unit 246, is developed as a result of the associated transmit mode reference signal propagating through the associated transceiver transmit path 316, radiating from the associated antenna element 204 to the calibration element 206, and ultimately propagating through a calibration unit receive signal path 318 which extends from the input to the calibration antenna element 206 to port 248 of the calibration processing unit 246 via the calibration antenna element 206, the coaxial cable 234, ports 292 and 294 of the duplexer 290, and via the calibration receive processor 304. Each of the transmit mode calibration paths includes an associated one of the transceiver transmit paths 316, an associated radiation path extending from the associated element 204 to the calibration element 206, and the calibration unit receive signal path 318.

Figure 1:
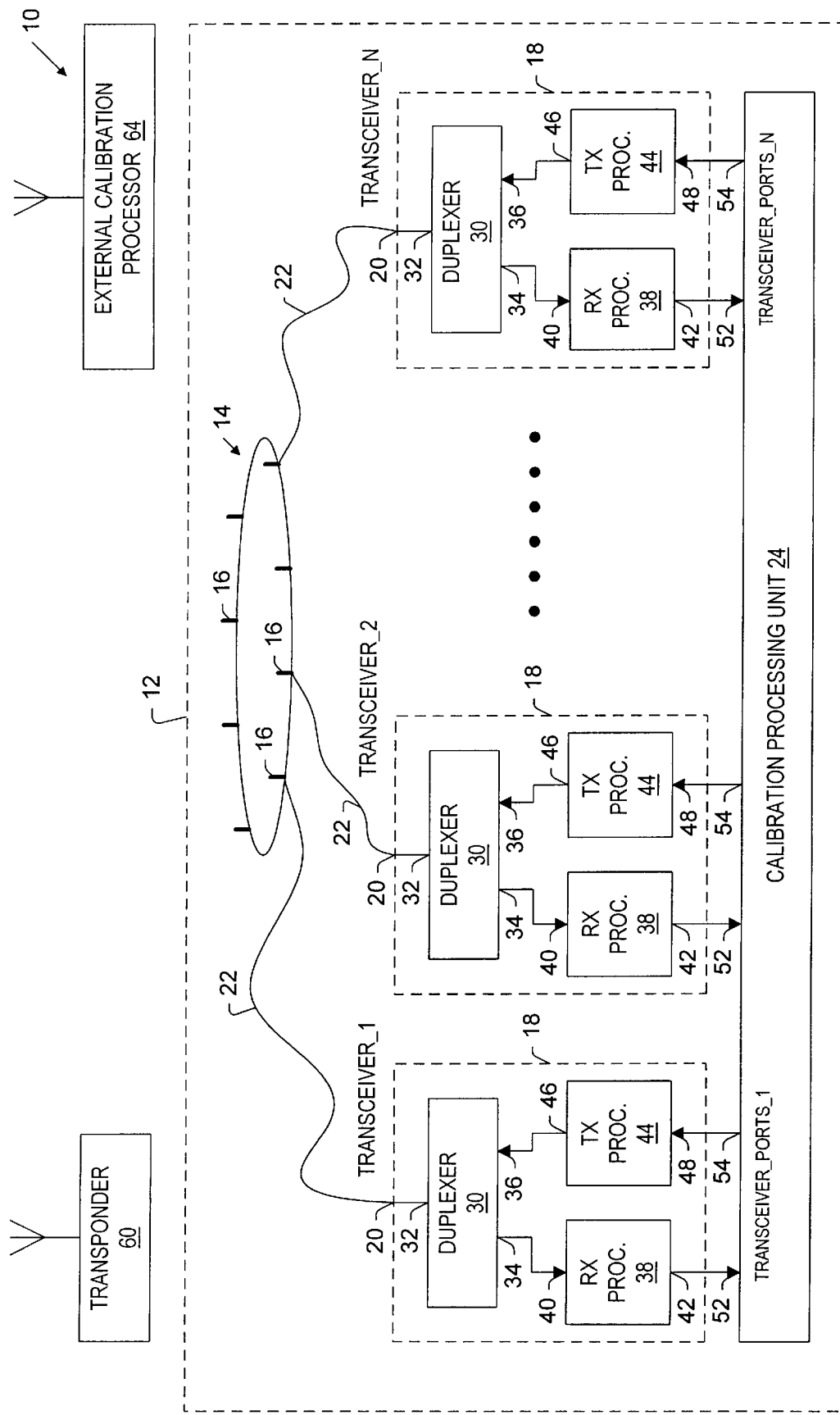
FIG. 1 is a schematic circuit block diagram of a prior art beam steering antenna array calibration system.
Figure 2A:
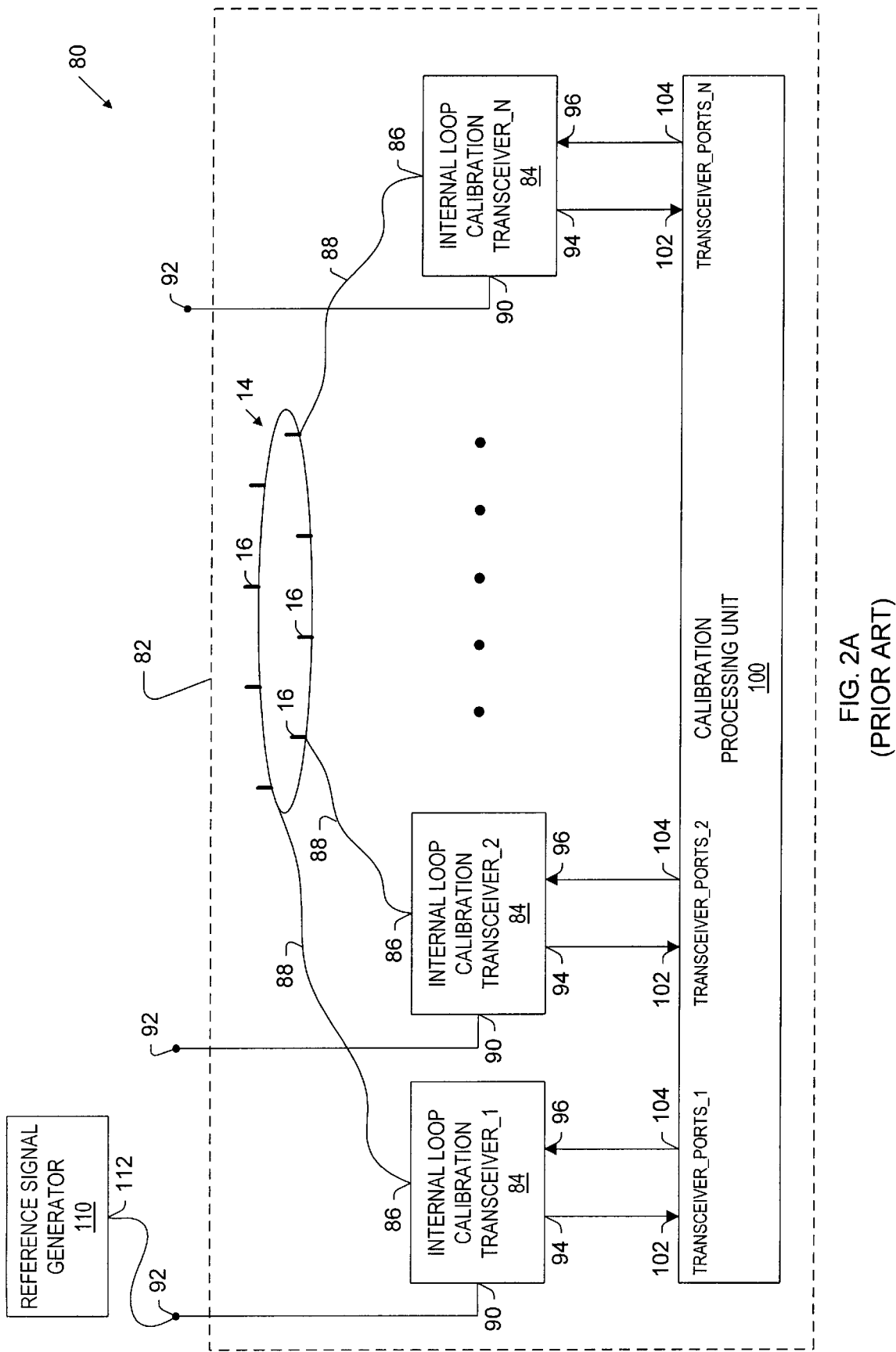
FIG. 2A is a schematic circuit block diagram of a prior art smart antenna array system including transceivers having internal loop calibration components for calibrating the antenna array system.
Figure 2B:
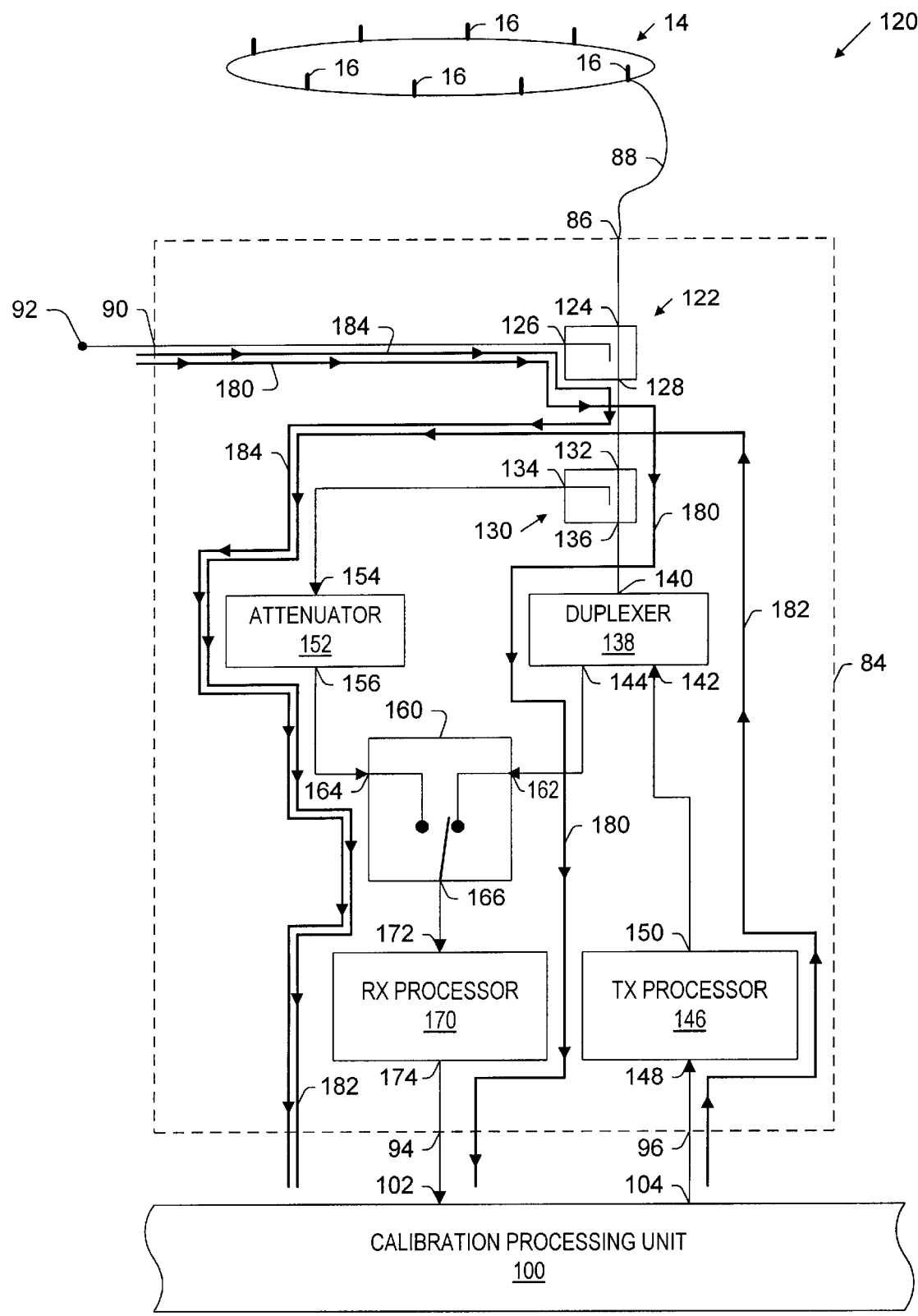
FIG. 2B is a schematic circuit block diagram illustrating further details of one of the transceivers having internal loop calibration components of FIG. 2A.

Note that each of the transceiver units 210 does not include any supplemental calibration components. This is in contrast with the "internal loop" calibration transceiver units 18 (FIG. 2B) of the prior art. The calibration components of the smart antenna system of the present invention are referred to as "in-system" because no external reference generator signal is required as in the prior art system of FIGS. 2A and 2B. Also, the components of the transceiver calibration unit 238 are referred to as "external loop" components because no calibration components are inserted in the signal paths 314 and 316 of the transceiver units 210. Because there are no calibration components, such as switches, couplers, and attenuator in the transceiver units 210, the smart antenna transceiver system 200 (FIG. 3) provides optimal sensitivity to signals received by the elements 204.

In the receive calibration mode, the calibration processing unit 246 generates a receive mode reference signal at its port 250, and the receive mode reference signal propagates via the calibration unit transmit signal path 312. A receive mode resultant signal is developed at port 222 of the control processing unit 220 as a result of the receive mode calibration reference signal propagating through a receive mode calibration signal path traversing the calibration unit transmit signal path 312, a radiation path between the calibration element 206 and the associated antenna element 204, and the associated transceiver receive path 314. The control processing unit 220 is operative to determine phase shifts and amplitude differences between the receive mode reference signals generated at port 250 of the calibration processing unit 246 and the receive mode resultant signals developed at port 222 of the control processing unit 220 to yield a receive calibration vector $V_{rc}$ that is indicative of the signal path characteristics associated with each one of the receive mode calibration paths. The receive mode calibration vector may be expressed in accordance with relationship (2) below.

$$V_{rc} = V_r \cdot V_{ct}' = [v_{rc1}, v_{rc2}, \ldots, v_{rcN}] = [v_{r1}, v_{r2}, \ldots, v_{rN}] \cdot [v_{ct1}, v_{ct2}, \ldots v_{ctN}]' \quad (2)$$

Wherein the vector $V_r$ is a receive vector indicative of signal path characteristics associated with the transceiver path 314 of each of the transceiver units 210 (FIG. 3). The vector $V_{ct}$ is a calibration unit transmit vector indicative of the signal path characteristics associated with the calibration unit transmit signal path 312. Note that the calibration unit transmit signal path 312 and the transceiver receive path 314 cascade. Therefore the signal characteristics associated with the total receive mode calibration path, including paths 312 and 314, may be determined by determining the dot product of the vectors including the complex numbers representing the signal characteristics of each of the paths. Linear algebra is employed in order to determine the receive mode calibration vector $V_{rc}$ because there are a plurality of N of the transceiver units 210 (FIG. 3) and N of the antenna elements 204. Note that all elements of the vector $V_{ct}$ are the same because there is only one calibration unit 238 and only one.

In the transmit calibration mode, each of the transceiver units 210 transmits a signal via the corresponding antenna element 204. The calibration processing unit 220 generates a transmit mode calibration reference signal at the transmit port 224 which is connected to the associated one of the transceiver unit 210. The signal propagates via the corresponding transceiver transmit path 316 to the associated antenna element. The transmit mode resultant signal developed at port 248 of the calibration processing unit is developed as a result of the associated transmit reference signal propagating via the transceiver transmit path 316, radiating from the associated antenna element 204 to the calibration element 206, and propagating via the calibration unit receive signal path 318. The calibration processing unit 246 is operative to determine phase shifts and amplitude differences between the transmit mode reference signals generated at the ports 224 of the processing unit 220, and the associated transmit mode resultant signals received at port 248 of the calibration processing unit 246 to yield a transmit mode calibration vector $V_{tc}$ which is indicative of the signal path characteristics associated with each one of the transmit mode calibration paths.

Wherein the transmit mode calibration vector $V_{tc}$ may be expressed in accordance with relationship (3) below.

$$V_{tc} = V_t \cdot V_{cr}' = V_{tc} = [v_{tc1}, v_{tc2}, \ldots v_{tcN}] = [v_{t1}, v_{t2}, \ldots v_{tN}] \cdot [v_{cr1}, v_{cr2}, \ldots v_{crN}]' \quad (3)$$

The vector $V_t$ is a transmit vector indicative of signal path characteristics associated with the transceiver transmit path 316 of each of the transceiver units 210 (FIG. 3). The vector $V_{cr}$ is a calibration unit receive vector indicative of the signal path characteristics associated with the calibration unit receive signal path 318. Note that the transmit mode calibration vector $V_{tc}$ is determined by the product of the transmit vector $V_t$ and the calibration unit receive vector $V_{cr}$ because the paths 316 and 318 are cascade. Note that each of the elements of the calibration unit receive vector $V_{cr1}$ are equal and equal to a complex constant because the calibration unit receive path 318 is common to the receive mode signal path associated with each of the antenna elements 204.

One advantage of the in-system external loop calibration of the present invention is that there is no need for a technician in the field to apply a reference signal via a reference signal generator, and there is no need to terminate the coaxial cables during the calibration process. The calibration process described above is automatic and may be remotely initiated.

Each of the elements 204 is associated with a corresponding plurality of channels, or carriers. In one embodiment, each of the elements 204 has 8 channels associated with it, and the transceiver units 210, transceiver calibration unit 238, and calibration processing sub-system 219 are configured to process the data carried by each of the eight channels.

FIG. 5 shows a schematic block diagram illustrating further details of the calibration transceiver unit 238 (FIG. 3) at 320. The calibration transmit processor 298 includes: a first digital up-converter 322 having an input port 324 communicatively coupled with port 250 of the calibration processing unit 246 via port 300 of the calibration transmit processor, and an output port 328; a second digital up-converter 330 having a first input port 334 communicatively coupled with port 328 of the first digital up-converter 322, a second input port 332 communicatively coupled with port 250 of the processing unit 246 via port 300 of the calibration transmit processor, and an output port 336; a digital-to-analog converter (D/A converter) 340 having an input port 342 communicatively coupled with port 336 of the second digital up-converter 330, and an output port 344; a band pass filter 346 having an input port 348 communicatively coupled with port 344 of the D/A converter 340, and an output port 350, a transmit path mixer 354 having an input port 356 communicatively coupled to receive a band pass filtered signal from port 350 of the filter 346, an input port 358 for receiving a transmit path reference signal, and an output port 360; a reference signal generator 362 having an output port 364 for providing the transmit path reference signal to input port 358 of the mixer 354; and a preamplifier 366 having an input port 368 communicatively coupled with port 360 of the mixer 354, and an output port 370 communicatively coupled with the input port 296 of the duplexer 290 via port 302 of the calibration transmit processor.

The calibration receive processor 304 includes: a preamplifier 380 having an input port 382 communicatively coupled with port 294 of the duplexer 290 via port 306 of the calibration receive processor, and an output port 384; a receiver path mixer 386 having an input port 388 communicatively coupled with port 384 of the amplifier 380, an input port 390 for receiving a receive path reference signal, and an output port 392; a receive path reference signal generator 394 having an output port 396 for providing the receive path reference signal to port 390 of the mixer 386; a band pass filter 400 having an input port 402 for receiving a mixed receive signal from the output 392 of the mixer 386, and an output port 404 for providing a band pass filtered receive signal; an analog-to-digital converter (A/D converter) 408 having an input port 410 communicatively coupled with port 404 of the band pass filter for receiving the filtered receive signal, and an output port 412 for providing a digital receive signal to a node 414; a first digital down-converter 416 having an input port 418 for receiving four channels of the digital receive signal from port 412 of the A/D converter via node 414, and an output port 420 communicatively coupled with port 248 of the in-system calibration processing unit 246 via port 308 of the calibration receive processor; and a second digital down-converter 424 having an input port 426 for receiving four channels of the digital receive signal provided at port 412 of the A/ID converter 408 via node 414, and an output port 428 communicatively coupled with port 248 of the calibration processing unit 246 via port 308 of the calibration receive processor.

The digital up- and down-converters 322, 330, 416, and 424 provide digital control for tuning to the corresponding channels, or carriers, of each of the transmit and receive signals transmitted to and received from the antenna calibration element 206.

The in-system external loop calibration smart antenna system of the present invention may be used in a wide variety of smart antenna transceiver system applications. In one embodiment, the system is used in a base station of a cellular telephone system which may be operated in accordance with any of a variety of well-known protocols including TDMA and CDMA. For different systems, the channels are allocated and used differently. Note that in the calibration process, the calibration vectors may be determined for each channel one at a time, successively. However in the preferred embodiment, the calibration vectors are determined simultaneously for each of the eight channels, or carriers, associated with each of the elements 204 of the antenna array 202.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A smart antenna system comprising:

an antenna array including a plurality of antenna elements, and at least one antenna calibration element for radiating and receiving radiated signals to and from each of said antenna elements;

a plurality of antenna element coupling means;

a plurality of transceiver units each including an input/output port communicatively coupled with an associated one of said antenna elements via an associated one of said antenna coupling means, a receive port, and a transmit port;

a transceiver calibration unit including a calibration input/output port communicatively coupled with said calibration element, a calibration receive port, and a calibration transmit port; and signal processing means communicatively coupled with each of said receive ports and said transmit ports of each of said transceiver units, and communicatively coupled with said calibration receive port said calibration transmit port of said calibration unit;

wherein a transmitter calibration path associated with each one of said antenna elements extends from said transmit port of said associated transceiver unit to said associated antenna element, from said associated antenna element to said calibration element, and from said calibration element to said calibration receive port of said calibration unit;

wherein a receiver calibration path associated with each one of said antenna elements extends from said calibration transmit port of said calibration unit to said calibration element, from said calibration element to said associated antenna element, and from said associated antenna element to said receive port of said associated transceiver unit;

said signal processing means being operative in a transmit calibration mode to provide a transmit mode reference signal to said transmit port of each of said transceiver units, and being responsive to transmit mode resultant signals developed as a result of associated ones of said transmit reference signals propagating through associated ones of said transmitter calibration paths, said signal processing means also being operative to determine a transmit mode calibration vector by determining amplitude differences and phase shifts between said transmit mode reference signals and said associated transmit mode resultant signals;

said signal processing means also being operative in a receive calibration mode to provide receive mode reference signals to said calibration transmit port of said calibration unit, and being responsive to receive mode resultant signals developed as a result of associated ones of said receive mode reference signals propagating through associated ones of said receiver calibration paths, said signal processing means being further operative to determine a receive mode calibration vector by determining amplitude differences and phase shifts between said receive mode reference signals and said associated receive mode resultant signals.

2. A smart antenna system as recited in claim 1 wherein said antenna elements are disposed in a generally circular array, and wherein said calibration element is disposed proximate a center point of said array.

3. A smart antenna system as recited in claim 1 wherein said input/output port of said calibration unit is communicatively coupled with said calibration element via a coaxial cable.

4. A smart antenna system as recited in claim 1 wherein each of said antenna coupling means comprises a coaxial cable.

5. A smart antenna system as recited in claim 1 wherein each of said transceiver units further comprises:
- a duplexer having a first port communicatively coupled with said input/output port of said transceiver, a receive path port, and a transmit path port;
- a receive processor having an input port communicatively coupled with said receive path port of said duplexer, and an output port communicatively coupled with said receive port of said transceiver unit; and
- a transmit processor having an input port communicatively coupled with said transmit port of said transceiver unit, and an output port communicatively coupled with said transmit path port of said duplexer.

6. A smart antenna system as recited in claim 1 wherein said calibration unit comprises:
- a duplexer having a first port communicatively coupled with said input/output port of said calibration unit, a receive path port, and a transmit path port;
- a calibration receive processor having an input port communicatively coupled with said receive path port of said duplexer, and an output port communicatively coupled with said calibration receive port of said calibration unit; and
- a calibration transmit processor having an input port communicatively coupled with said calibration transmit port of said calibration unit, and an output port communicatively coupled with said transmit path port of said duplexer.

7. A smart antenna system as recited in claim 6 wherein said signal processing means and each of said transceiver units are operative to transmit and receive signals carrying a plurality of channels, and wherein each of said receive mode reference signals and each of said transmit mode reference signals carries a plurality of channels.

8. A smart antenna system as recited in claim 7 wherein said calibration transmit processor further comprises:
- a first digital up-converter having an input port for receiving a first portion of said channels of said receive mode reference signals from said signal processing means, and an output port; and
- a second digital up-converter having a first input for receiving a second portion of said channels of said receive mode reference signals from said signal processing means, a second input port communicatively coupled with said output port of said first up-converter, and an output port;
- a digital to analog converter having an input port communicatively coupled with said output port of said second up-converter, and an output port for providing analog reference signals;
- a band pass filter having an input port for receiving said analog reference signals, and an output port for providing band-pass filtered signals;
- a transmitter mixer having a first input port for receiving said band-pass filtered signals, a second input port for receiving a calibration reference signal, and an output port for providing a mixed signal;
- a reference signal generator for providing said calibration reference signal to said second input port of said mixer, and
- a preamplifier having an input port for receiving said mixed signal, and an output port communicatively coupled with said transmit path port of said duplexer.

9. A smart antenna system as recited in claim 7 wherein said calibration receive processor further comprises:
- a preamplifier having an input port coupled with said receive path port of said duplexer, and an output port;
- a receiver mixer having a first input port communicatively coupled with said output port of said preamplifier, a second input port for receiving a calibration reference signal, and an output port for providing a mixed signal;
- a reference signal generator for providing said calibration reference signal to said second port of said mixer;
- a band-pass filter having an input port for receiving said mixed signal, and an output port for providing a band-pass filtered signal; and
- an analog-to-digital converter having an input port for receiving said filtered signal from said band-pass filter, and an output port providing a digital signal having a plurality of channels;
- a first digital down-converter having an input port responsive to a first portion of said channels of said digital signal provided at said output port of said analog to digital converter, and an output port communicatively coupled with said signal processing means; and
- a second digital down-converter having an input port responsive to a second portion of said channels of said digital signal provided at said output port of said analog to digital converter, and an output port communicatively coupled with said signal processing means.

10. A smart antenna system as recited in claim 1 wherein said signal processing means comprises:
- a control processing unit having a plurality of ports communicatively coupled with said receive ports and said transmit ports of each of said transceiver units; and
- a calibration processing unit communicatively coupled with said calibration receive port and said calibration transmit port of said calibration unit, and also being communicatively coupled with said control processing unit.

11. A smart antenna system as recited in claim 10 wherein said calibration processing unit and said calibration unit are enclosed in a shielded enclosure.

12. A smart antenna system comprising:
- an antenna array including a plurality of antenna elements, and at least one antenna calibration element for radiating and receiving radiated signals to and from each of said antenna elements;
- a plurality of antenna element coupling means;
- a plurality of transceiver units each including an input/output port communicatively coupled with an associated one of said antenna elements via an associated one of said antenna coupling means, a receive port, and a transmit port;
- a transceiver calibration unit including a calibration input/output port communicatively coupled with said calibration element, a calibration receive port, and a calibration transmit port; and
- signal processing means communicatively coupled with each of said receive ports and said transmit ports of each of said transceiver units, and communicatively coupled with said calibration receive port and said calibration transmit port of said calibration unit;

wherein a transmitter calibration path associated with each one of said antenna elements extends from said transmit port of said associated transceiver unit to said associated antenna element, from said associated antenna element to said calibration element, and from said calibration element to said calibration receive port of said calibration unit;

said signal processing means being operative in a transmit calibration mode to provide a transmit mode reference signal to said transmit port of each of said transceiver units, and being responsive to transmit mode resultant signals developed as a result of associated ones of said transmit reference signals propagating through associated ones of said transmitter calibration paths, said signal processing means also being operative to determine a transmit mode calibration vector by determining amplitude differences and phase shifts between said transmit mode reference signals and said associated transmit mode resultant signals.

13. A smart antenna system as recited in claim 12 wherein said antenna elements are disposed in a generally circular array, and wherein said calibration element is disposed proximate a center point of said array.

14. A smart antenna system as recited in claim 12 wherein said input/output port of said calibration unit is communicatively coupled with said calibration element via a coaxial cable.

15. A smart antenna system as recited in claim 12 wherein each of said antenna coupling means comprises a coaxial cable.

16. A smart antenna system comprising:

an antenna array including a plurality of antenna elements, and at least one antenna calibration element for radiating and receiving radiated signals to and from each of said antenna elements;

a plurality of antenna element coupling means;

a plurality of transceiver units each including an input/output port communicatively coupled with an associated one of said antenna elements via an associated one of said antenna coupling means, a receive port, and a transmit port;

a transceiver calibration unit including a calibration input/output port communicatively coupled with said calibration element, a calibration receive port, and a calibration transmit port; and signal processing means communicatively coupled with each of said receive ports and said transmit ports of each of said transceiver units, and communicatively coupled with said calibration receive port and said calibration transmit port of said calibration unit;

wherein a receiver calibration path associated with each one of said antenna elements extends from said calibration transmit port of said calibration unit to said calibration element, from said calibration element to said associated antenna element, and from said associated antenna element to said receive port of said associated transceiver unit;

said signal processing means being operative in a receive calibration mode to provide receive mode reference signals to said calibration unit port of said calibration unit, and being responsive to receive mode resultant signals developed as a result of associated ones of said receive mode reference signals propagating through associated ones of said receiver calibration paths, said signal processing means being further operative to determine a receive mode calibration vector by determining amplitude differences and phase shifts between said receive mode reference signals and said associated receive mode resultant signals.

17. A smart antenna system as recited in claim 16 wherein said antenna elements are disposed in a generally circular array, and wherein said calibration element is disposed proximate a center point of said array.

18. A smart antenna system as recited in claim 16 wherein said input/output port of said calibration unit is communicatively coupled with said calibration element via a coaxial cable.

19. A smart antenna system as recited in claim 16 wherein each of said antenna coupling means comprises a coaxial cable.

* * * * *